(12) United States Patent
Ahn et al.

(10) Patent No.: US 10,497,305 B2
(45) Date of Patent: Dec. 3, 2019

(54) APPARATUS AND METHOD OF PREVENTING SIGNAL DELAY IN DISPLAY DEVICE

(71) Applicant: Samsung Display Co., Ltd., Yongin-si (KR)

(72) Inventors: Soon-Il Ahn, Cheonan-si (KR); Seung-Soo Baek, Seoul (KR); Seong-Young Lee, Anyang-si (KR); Kee-Bum Park, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/408,641

(22) Filed: Jan. 18, 2017

(65) Prior Publication Data

US 2017/0124945 A1 May 4, 2017

Related U.S. Application Data

(62) Division of application No. 14/149,013, filed on Jan. 7, 2014, now Pat. No. 9,588,388, which is a division
(Continued)

(30) Foreign Application Priority Data

Jan. 22, 2008 (KR) ........................ 10-2008-0006755

(51) Int. Cl.
*G09G 3/3225* (2016.01)
*G02F 1/1335* (2006.01)
(Continued)

(52) U.S. Cl.
CPC ....... *G09G 3/3225* (2013.01); *G02F 1/13454* (2013.01); *G02F 1/133512* (2013.01);
(Continued)

(58) Field of Classification Search
CPC ......... G02F 1/134363; G02F 1/136204; G02F 1/136286; G02F 1/1365;
(Continued)

(56) References Cited

U.S. PATENT DOCUMENTS 5,719,647 A * 2/1998 Fujikawa ............... G02F 1/1365
349/40
6,266,117 B1 * 7/2001 Yanagawa ......... G02F 1/133707
349/111
(Continued)

FOREIGN PATENT DOCUMENTS

CN 1766718 5/2006
CN 1987573 6/2007
(Continued)

*Primary Examiner* — Huyen L Ngo
(74) *Attorney, Agent, or Firm* — Cantor Colburn LLP

(57) ABSTRACT

An apparatus and method of preventing signal delay in a display device according to the present invention includes a first substrate, a driving portion formed on the first substrate, a plurality of signal lines formed on the first substrate to transmit signals to the driving portion, a second substrate facing the first substrate, and a conductive member formed on the second substrate, wherein the driving portion overlaps with the conductive member, and the signal lines overlap with the conductive member at a position outside a display area. Accordingly, the capacitances between the signal lines may be substantially the same.

2 Claims, 10 Drawing Sheets

Related U.S. Application Data of application No. 12/275,338, filed on Nov. 21, 2008, now Pat. No. 8,711,318.

(51) Int. Cl.
  *G02F 1/1345* (2006.01)
  *G02F 1/1362* (2006.01)
  *G09G 3/20* (2006.01)
  *G09G 3/36* (2006.01)
  *G02F 1/1368* (2006.01)

(52) U.S. Cl.
  CPC .. *G02F 1/136209* (2013.01); *G02F 1/136286* (2013.01); *G09G 3/20* (2013.01); *G09G 3/3648* (2013.01); *G02F 1/1345* (2013.01); *G02F 1/1368* (2013.01); *G02F 1/133514* (2013.01); *G02F 1/136213* (2013.01); *G02F 2201/123* (2013.01); *G09G 2300/04* (2013.01); *G09G 2300/0426* (2013.01); *G09G 2300/0439* (2013.01); *G09G 2300/0842* (2013.01); *G09G 2310/08* (2013.01); *G09G 2320/0223* (2013.01); *Y10T 29/49155* (2015.01)

(58) Field of Classification Search
  CPC .......... G02F 2001/13629; G02F 2001/136295; G02F 1/136209; G02F 1/133512; G02F 1/13454; G02F 1/1368; G02F 2201/123; G02F 1/133514; G02F 1/136213; G02F 1/1345; G09G 3/3225; G09G 3/3648; G09G 3/20; G09G 2310/08; G09G 2300/04; G09G 2300/0426; G09G 2300/0439; G09G 2300/0842; G09G 2320/0223; Y10T 29/49155
  See application file for complete search history.

(56) References Cited

U.S. PATENT DOCUMENTS

| | | | |
|---|---|---|---|
| 6,760,005 B2 * | 7/2004 | Koyama | G09G 3/20 345/100 |
| 6,970,221 B1 | 11/2005 | Park et al. | |
| 7,362,395 B2 * | 4/2008 | Kim | G02F 1/1345 345/80 |
| 7,705,839 B2 * | 4/2010 | Murade | G09G 3/3648 345/100 |
| 7,719,650 B2 * | 5/2010 | Sugiyama | G02F 1/1345 29/827 |
| 7,821,588 B2 | 10/2010 | Chang et al. | |
| 7,961,282 B2 * | 6/2011 | Iwato | G02F 1/133711 349/123 |
| 8,004,480 B2 | 8/2011 | Kim et al. | |
| 8,553,182 B2 | 10/2013 | Sugiyama et al. | |
| 8,704,991 B2 | 4/2014 | Chang et al. | |
| 2002/0008682 A1 | 1/2002 | Park | |
| 2002/0093617 A1 * | 7/2002 | Matsuyama | G02F 1/13394 349/156 |
| 2002/0176043 A1 | 11/2002 | Fukami et al. | |
| 2003/0035081 A1 | 2/2003 | Jung et al. | |
| 2003/0043313 A1 | 3/2003 | Minoura | |
| 2005/0018121 A1 | 1/2005 | Jen et al. | |
| 2005/0225692 A1 | 10/2005 | Yanagawa et al. | |
| 2006/0092357 A1 | 5/2006 | Ishitani | |
| 2006/0139516 A1 * | 6/2006 | Park | G02F 1/133512 349/110 |
| 2006/0158599 A1 | 7/2006 | Koo | |
| 2007/0076135 A1 * | 4/2007 | Gomyou | G02F 1/135 349/25 |
| 2007/0139600 A1 | 6/2007 | Lee et al. | |
| 2008/0024407 A1 | 1/2008 | Yamaguchi | |
| 2008/0055526 A1 * | 3/2008 | Ino | G02F 1/133555 349/114 |
| 2008/0157364 A1 | 7/2008 | Yang et al. | |
| 2008/0303776 A1 | 12/2008 | Jung | |
| 2010/0141849 A1 * | 6/2010 | Enda | G02F 1/13624 348/731 |

FOREIGN PATENT DOCUMENTS

| | | |
|---|---|---|
| JP | 11084353 | 3/1999 |
| JP | 11125836 | 5/1999 |
| KR | 1020060077473 | 7/2006 |
| KR | 1020070065626 | 6/2007 |
| TW | 200714959 | 4/2007 |

* cited by examiner

APPARATUS AND METHOD OF PREVENTING SIGNAL DELAY IN DISPLAY DEVICE

This application is a divisional of U.S. patent application Ser. No. 14/149,013, filed on Jan. 7, 2014, which is a divisional of U.S. patent application Ser. No. 12/275,338, filed on Nov. 21, 2008, which claims priority to Korean Patent Application No. 10-2008-0006755, filed on Jan. 22, 2008, and all the benefits accruing therefrom under 35 U.S.C. § 119, the contents of which in its entirety are herein incorporated by reference.

BACKGROUND OF THE INVENTION (a) Field of the Invention

The present invention relates to a display device and method thereof. More particularly, the present invention relates to a display device having improved display quality and a method of preventing signal delay in the display device.

(b) Description of the Related Art

A liquid crystal display ("LCD"), a plasma display panel ("PDP"), and an organic light emitting device ("OLED") are among widely used flat panel displays.

Among these flat panel displays, the LCD and the OLED include a display panel including switching elements and display signal lines, and a gate driver outputting gate signals to gate lines among the display signal lines to turn on/off the switching elements. The gate driver may be made of at least one chip or may be integrated with the display panel.

A signal controller that processes externally input image data and controls the gate driver uses a plurality of control signals for the control of the gate driver. The signal controller generates various signals such as a scanning start signal to instruct the application of the gate signal, a gate clock signal to determine the application time of the pulse width of the gate signal, and an output enable signal to determine a pulse width of the gate signal.

When integrating the gate driver with the display panel, the signals for driving the gate driver are transmitted through the signal lines connected to a signal generator, and the gate driver transmits the gate signals to the gate lines.

BRIEF SUMMARY OF THE INVENTION

It has been determined herein, according to the present invention, that when the signal generator transmits signals for driving the driving portion through the signal lines, the resistance and the capacitance between the signal lines must be uniform, and if it is not, such as in the prior art, a signal delay between the signal lines becomes different. The difference between the signal delays generates a luminance difference between the gate lines such that longitudinal stripes appear in the conventional display.

A display device according to exemplary embodiments of the present invention includes a first substrate, a driving portion formed on the first substrate, a plurality of signal lines formed on the first substrate to transmit signals to drive the driving portion, a second substrate facing the first substrate, and a conductive member formed on the second substrate, wherein the driving portion overlaps with the conductive member, and the signal lines are disposed at a position outside a region of overlap of the conductive member.

The signal lines may transmit signals that are changed per period. The signals that are changed per period may be clock signals.

The conductive member may be a light blocking member. The light blocking member may be made of a metal or an organic material. The conductive member may be a common electrode.

The width of the signal line may be in a range of about 60 µm to about 290 µm. An interval between two neighboring signal lines among the signal lines may be at least about 10 µm.

A distance between a pattern projected by the conductive member on the first substrate and the signal line nearest the conductive member may be larger than the interval between two neighboring signal lines.

The display device may further include a plurality of diverged lines with one end of each being respectively connected to a signal line and the other ends thereof being connected to the driving portion.

At least some of the diverged lines may include a bent portion with a zigzag shape, and lengths of the bent portions with the zigzag shape may be different from each other.

The bent portions with the zigzag shape may be disposed between the signal lines and the driving portion.

The diverged lines may overlap the conductive member with different widths from each other.

A display device according to other exemplary embodiments of the present invention includes a first substrate, a driving portion formed on the first substrate, a plurality of signal lines formed on the first substrate and transmitting signals that are changed per period, a second substrate facing the first substrate, and a plurality of first conductive members formed on the second substrate, wherein the first conductive members respectively face regions between two neighboring signal lines.

The first conductive members may overlap edge portions of the signal lines.

The minimum and maximum of a width of each of the first conductive members may respectively be about 10 µm and about {the maximum interval between the signal lines+(the width of the signal line−10 µm)}µm.

The display device may further include a second conductive member formed on the second substrate in an interval between the first conductive members and overlapping a central portion of the signal lines.

An interval between the first conductive member and the second conductive member may be at least about 10 µm.

The width of the first conductive member may be the same as the interval between two neighboring signal lines.

A display device according to still other exemplary embodiments of the present invention includes a first substrate, a driving portion formed on the first substrate, a plurality of signal lines formed on the first substrate and transmitting signals changed per period, a second substrate facing the first substrate, and a conductive member formed on the second substrate, wherein the conductive member overlaps the signal lines.

The display device may further include an overcoat formed on the conductive member, wherein the overcoat may overlap all the signal lines.

According to yet other exemplary embodiments of the present invention, a method of preventing signal delay in signal lines of a display device, the display device including a first substrate, a driving portion formed on the first substrate, the signal lines formed on the first substrate to transmit signals to the driving portion, and a second substrate facing the first substrate, includes forming a conductive member on the second substrate to overlap the driving portion, and arranging the conductive member on the second substrate such that the signal lines have a substantially same capacitance as each other.

Forming the conductive member on the second substrate may include forming the conductive member of a light blocking material.

Arranging the conductive member on the second substrate may include providing conductive member portions overlapping intervals between the signal lines.

Arranging the conductive member on the second substrate may include not overlapping the conductive member with the signal lines.

According to exemplary embodiments of the present invention, the resistance and capacitance of each signal line and corresponding diverged line are substantially the same such that the generation of the signal delay between the signal lines and between the diverged lines may be prevented. Accordingly, the difference of the luminance between the gate lines may be prevented, and furthermore the quality of the display device may be improved.

BRIEF DESCRIPTION OF THE DRAWINGS

The above and other features and advantages of the present invention will be more apparent from the following detailed description with reference to the accompanying drawings, wherein.

DETAILED DESCRIPTION OF THE INVENTION

Figure 1:
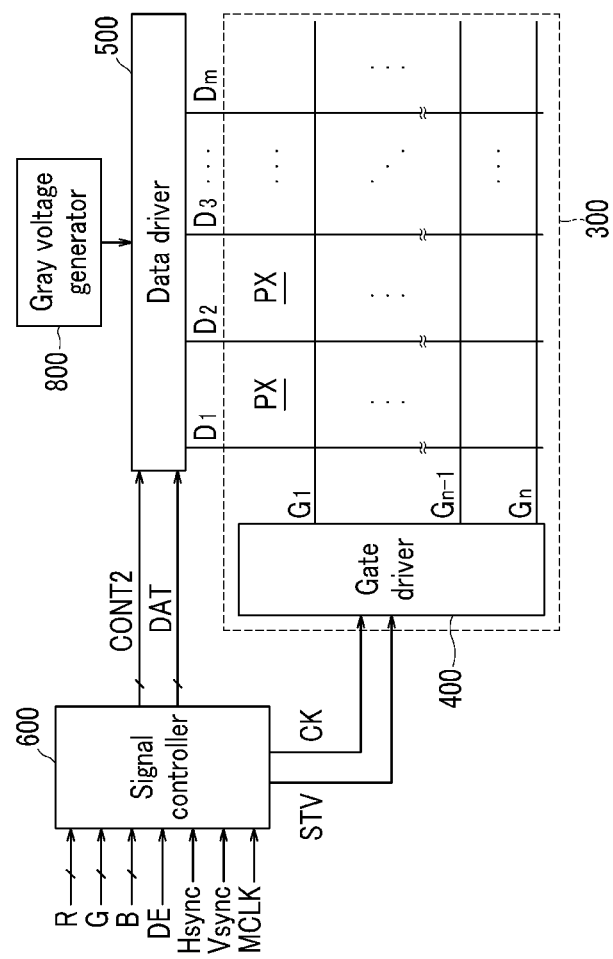
FIG. 1 is a block diagram of an exemplary display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Signal lines according to an exemplary embodiment of the present invention may be applied to various display devices such as a liquid crystal display ("LCD"), a plasma display panel ("PDP"), a field emission display ("FED"), a fluorescent display panel, and an organic light emitting device ("OLED"). In the accompanying drawings, an LCD is shown and an exemplary embodiment of the present invention is explained based thereon, but the display device according to an exemplary embodiment of the present invention is not limited to the LCD.

In the drawings, the thickness of layers, films, panels, regions, etc., are exaggerated for clarity. Like reference numerals designate like elements throughout the specification. It will be understood that when an element such as a layer, film, region, or substrate is referred to as being "on", "connected to" or "coupled to" another element, it can be directly on, connected or coupled to the other element or intervening elements may also be present. In contrast, when an element is referred to as being "directly on," "directly connected to" or "directly coupled to" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "below," "beneath," "lower," "above," "upper," and the like, may be used herein for ease of description to describe one device or element's relationship to another device(s) or element(s) as illustrated in the drawings. It will be understood that the spatially relative terms are intended to encompass different orientations of the device in use or operation in addition to the orientation depicted in the drawings.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Now, a display device according to an exemplary embodiment of the present invention will be described in detail with reference to FIG. 1 and FIG. 2.

Figure 2:
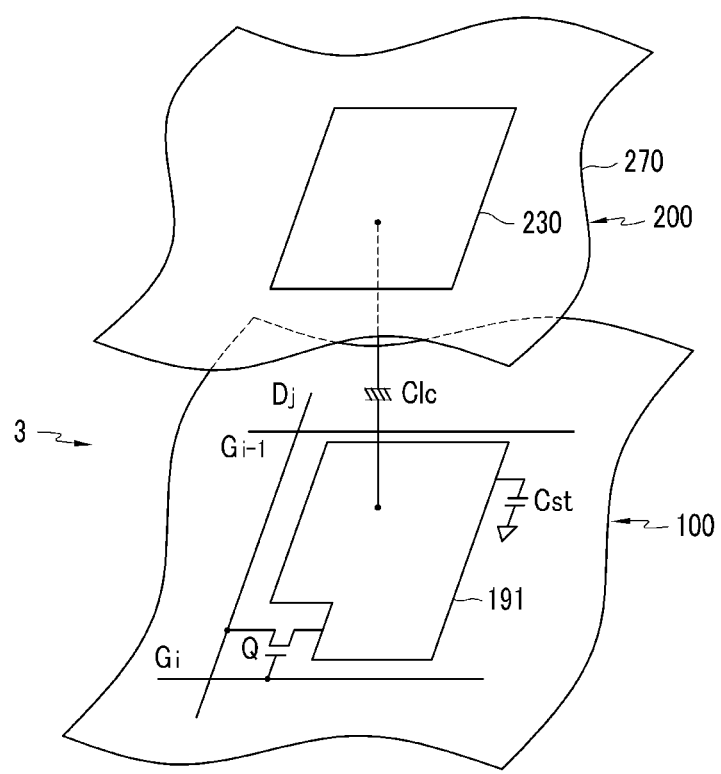
FIG. 2 is an equivalent circuit diagram of one pixel of an exemplary liquid crystal display ("LCD") according to an exemplary embodiment of the present invention.

FIG. 1 is a block diagram of an exemplary display device according to an exemplary embodiment of the present invention, and FIG. 2 is an equivalent circuit diagram of one pixel of an exemplary LCD according to an exemplary embodiment of the present invention.

As shown in FIG. 1, a display device according to the exemplary embodiment of the present invention includes a display panel assembly 300, a gate driver 400 and a data driver 500 connected to the display panel assembly 300, a gray voltage generator 800 connected to the data driver 500, and a signal controller 600 connected to the gate driver 400 and the data driver 500 for controlling the gate driver 400 and data driver 500.

In terms of an equivalent circuit, the display panel assembly 300 includes a plurality of signal lines $G_1$-$G_n$ and $D_1$-$D_m$ and a plurality of pixels PX connected with the plurality of signal lines $G_1$-$G_n$ and $D_1$-$D_m$ and arranged substantially in a matrix form.

The signal lines $G_1$-$G_n$ and $D_1$-$D_m$ include a plurality of gate lines $G_1$-$G_n$ for transferring gate signals (also referred to as scan signals), and a plurality of data lines $D_1$-$D_m$ for transferring data signals. The gate lines $G_1$-$G_n$ extend substantially in a row direction, such as a first direction, and are substantially parallel to each other, and the data lines $D_1$-$D_m$ extend substantially in a column direction, such as a second direction, and are substantially parallel to each other. The first direction may be substantially perpendicular to the second direction.

Each pixel PX, for example a pixel PX that is connected to an i-th (i=1, 2, ..., n) gate line $G_i$ and a j-th (j=1, 2, ..., m) data line $D_j$, includes a switching element Q that is connected to the signal lines $G_i$ and $D_j$ and a pixel circuit that is connected thereto.

The switching element Q is a three terminal element such as a thin film transistor ("TFT") that is provided in the lower panel 100, which may also be termed the TFT array panel 100, and a control terminal thereof, such as a gate electrode, is connected to the gate line $G_i$, an input terminal thereof, such as a source electrode, is connected to the data line $D_j$, and an output terminal, such as a drain electrode, thereof is connected to a liquid crystal capacitor Clc and a storage capacitor Cst. Also, the switching element Q may include amorphous silicon ("a-Si").

In the case of an LCD as a representative flat panel display, as shown in FIG. 2, the display panel assembly 300 includes the lower panel 100 and an upper panel 200 with a liquid crystal layer 3 formed therebetween, and the display signal lines $G_1$-$G_n$ and $D_1$-$D_m$ and the switching elements Q are provided on the lower panel 100. The pixel circuit of the LCD includes the liquid crystal capacitor Clc and the storage capacitor Cst connected to the switching element Q. In an alternative exemplary embodiment, the storage capacitor Cst may be omitted, if necessary.

The liquid crystal capacitor Clc includes a pixel electrode 191 on the lower panel 100 and a common electrode 270 on the upper panel 200 as two terminals. The liquid crystal layer 3 disposed between the pixel electrode 191 and the common electrode 270 functions as a dielectric of the liquid crystal capacitor Clc. The pixel electrode 191 is connected to the switching element Q, and the common electrode 270 covers the entire surface, or substantially the entire surface, of the upper panel 200 and is supplied with a common voltage Vcom. Alternatively, the common electrode 270 may be provided on the lower panel 100. In such an embodiment, at least one of the two electrodes 191 and 270 may have a shape of a bar or a stripe.

FIG. 2 shows that each pixel may include a color filter 230 displaying one color in a set of colors, such as primary colors, on the region of the upper panel 200 corresponding to the pixel electrode 191. Alternatively, the color filter 230 may be provided on or under the pixel electrode 191 on the lower panel 100.

Figure 3:
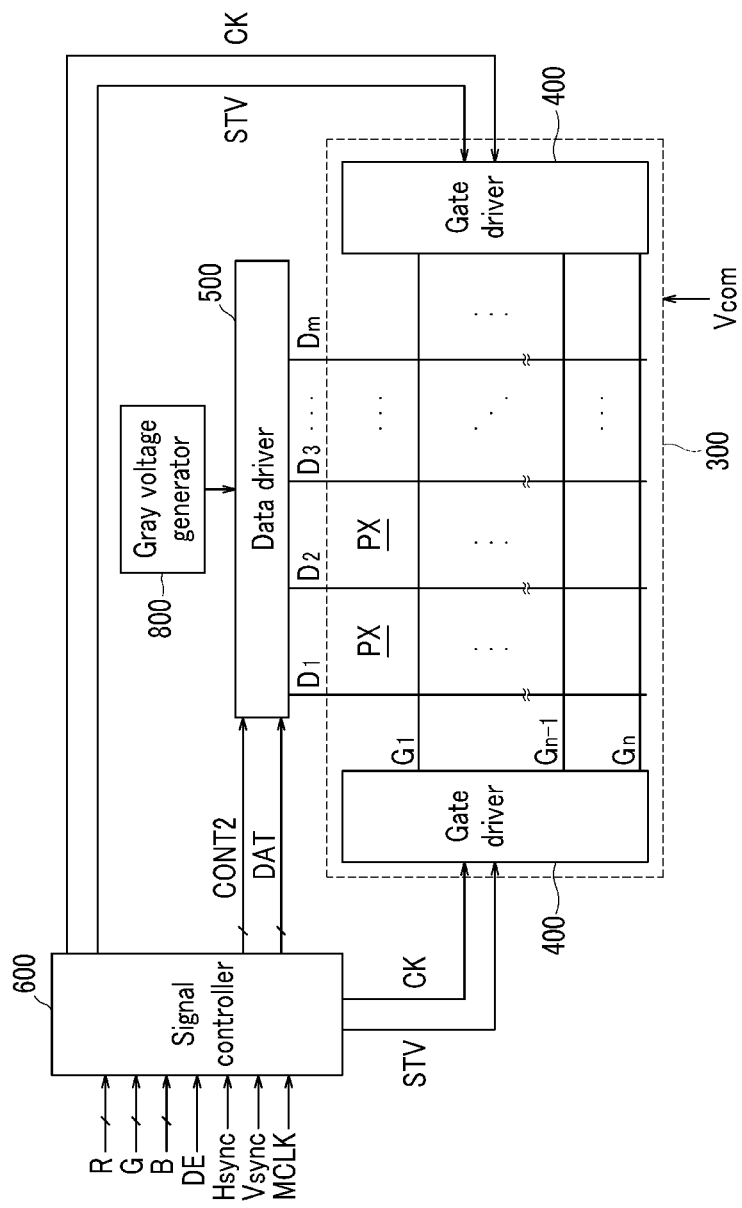
FIG. 3 is a block diagram of an exemplary display device according to another exemplary embodiment of the present invention.

Again referring to FIG. 1, the gate driver 400 is connected to the gate lines $G_1$-$G_n$ of the display panel assembly 300, and applies gate signals to the gate lines $G_1$-$G_n$. The gate driver 400 may be integrated with the display panel assembly 300 by being formed with the same process as that of the switching element Q of the pixel PX. However, the gate driver 400 may be formed from a different process and connected to the display panel assembly 300 differently. In FIG. 1, the gate driver 400 is disposed on one end of the display panel assembly 300. However, as shown in FIG. 3, a gate driver 400 may be disposed on each end of the display panel assembly 300.

The gate driver 400 applies gate signals having two values of the gate-on voltage Von and the gate-off voltage Voff according to the scanning start signal STV and a pair of clock signals CK, such as CKV and CKVB, from the signal controller 600 to the gate lines $G_1$-$G_n$, such that the switching elements Q connected to the gate lines $G_1$-$G_n$ are turned on or turned off. Here, the scanning start signal STV and the pair of clock signals CKV and CKVB are transmitted from the signal controller 600 to the gate driver 400 through the signal lines formed on the lower panel 100 directly as shown, or, alternatively, via the data driver 500.

Next, the structure of the display device according to an exemplary embodiment of the present invention will be described in detail with reference to FIGS. 4A, 4B and FIG. 5 as well as FIG. 1 and FIG. 2.

Figure 4A:
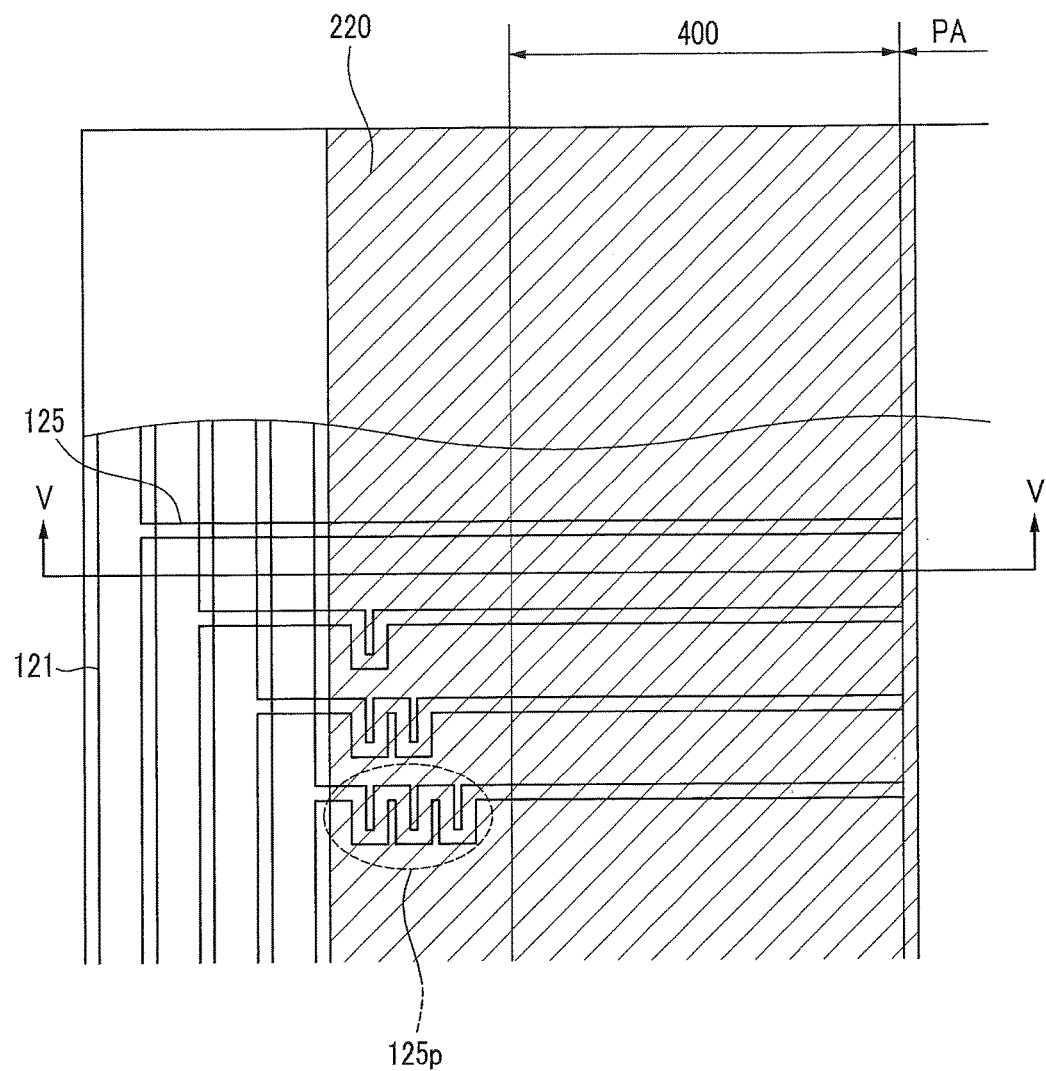
FIG. 4A is a layout view of an exemplary display device according to an exemplary embodiment of the present invention.
Figure 4B:
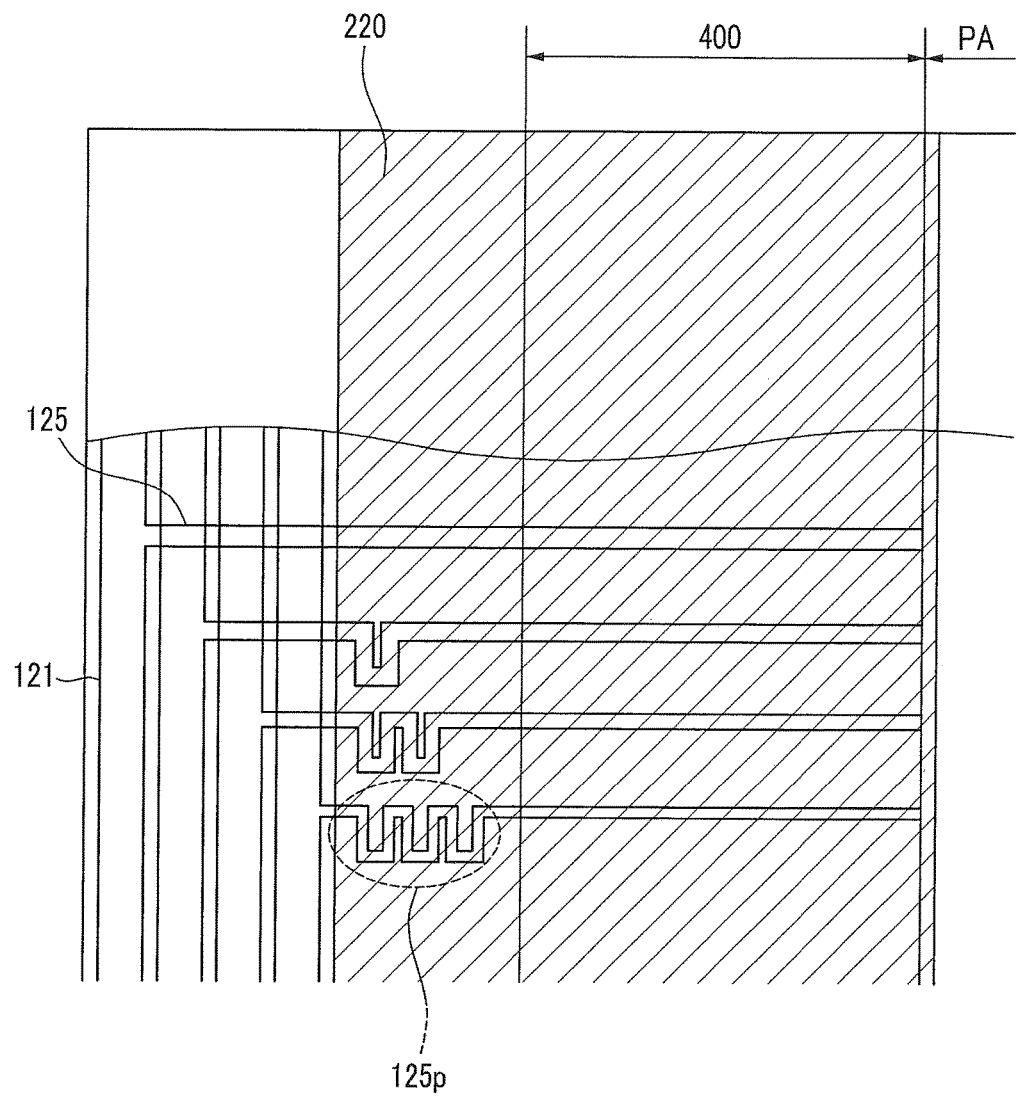
FIG. 4B is a layout view of another exemplary display device according to another exemplary embodiment of the present invention.
Figure 5:
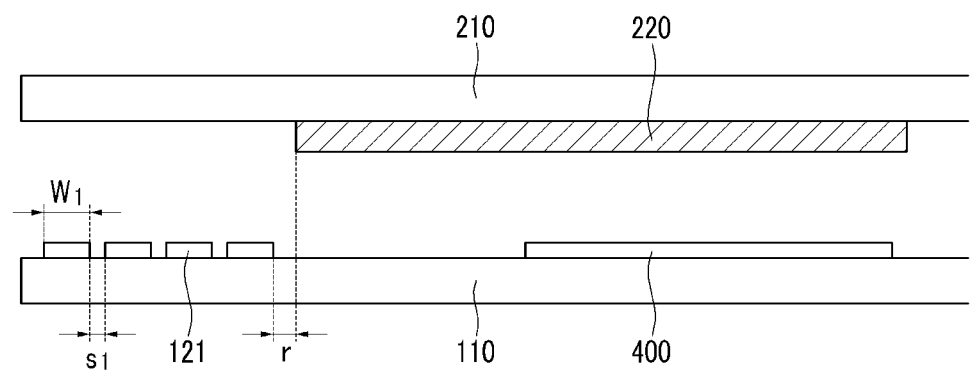
FIG. 5 is a cross-sectional view of the exemplary display device shown in FIG. 4 taken along line V-V.

FIG. 4A is a layout view of an exemplary display device according to an exemplary embodiment of the present invention, FIG. 4B is a layout view of another exemplary display device according to another exemplary embodiment of the present invention, and FIG. 5 is a cross-sectional view of the exemplary display device shown in FIG. 4A taken along line V-V.

Referring to FIG. 4A and FIG. 5, a gate driver 400 for transmitting gate signals is disposed adjacent an end edge of a display area PA including pixels PX. In the illustrated embodiment, the gate driver 400 is integrated with a lower substrate 110, and may be integrated at both edges of the display area PA, as previously described with respect to FIG. 3.

Four signal lines 121 for transmitting signals that are changed per period are formed at the side of the gate driver 400. The signal lines 121 extend in a vertical direction, the second direction, and are applied with a control signal from the signal controller 600. The control signal may be the clock signal CKV or CKVB, and the number of signal lines 121 may be variously changed according to design conditions. Also, the signal lines 121 may include all lines transmitting a DC signal as well as an AC signal.

A plurality of diverged lines 125 are respectively connected to the signal lines 121, and transmit signals such as clock signals per period to the gate driver 400. The diverged lines 125 may be made of the same material as the signal lines 121, and the widths thereof may all be the same or substantially the same. However, the diverged lines 125 may have different widths or different thicknesses from each other, as illustrated in FIG. 4B.

The signal lines 121 are extended in the vertical direction, the second direction, with a predetermined interval therebetween such that distances to the gate driver 400 therefrom are respectively different. However, the diverged lines 125 include bent portions 125*p* with a zigzag shape such that the lengths of the diverged lines 125 may all be the same or substantially the same, or may be different by a predetermined value, from the signal lines 121 to the gate driver 400. Accordingly, the entire resistance value of the signal lines 121 and the diverged lines 125 are the same, or substantially the same, or have a difference of a predetermined value. The bent portions 125*p* with a zigzag shape may be disposed between the signal lines 121 and the gate driver 400.

In detail, the diverged line 125 connected to the signal line 121 furthest from the gate driver 400 does not include the bent portions 125*p* with a zigzag shape, and the diverged lines 125 connected to the signal lines 121 disposed relatively nearer to the gate driver 400 include the bent portions 125*p* with a zigzag shape in order to extend a length of the diverged lines 125 that are disposed nearer to the gate driver 400. The lengths of the bent portions 125*p* with a zigzag shape are controlled according to the distance between the signal lines 121 and the gate driver 400. For example, the number of zigzags is varied according to the distance between the signal lines 121 and the gate driver 400. Thereby, the total lengths of the diverged lines 125 are the same or have a difference of the predetermined value. Therefore, the resistance of the signal lines 121 and their corresponding diverged lines 125 may be made to be the same.

While the diverged lines 125 are disclosed as including bent portions 125*p* such that the total lengths of the diverged lines 125 are the same, in an alternative exemplary embodiment, the widths of the diverged lines 125 may be varied depending on the proximity of the corresponding signal line 121 to the gate driver 400. For example, a diverged line 125 connected to a signal line 121 further from the gate driver 400 may be wider than a diverged line 125 connected to a signal line 121 closer to the gate driver 400. In such an embodiment, the widths of the diverged lines 125 may be controlled such that the resistance of the signal lines 121 and their corresponding diverged lines 125 may be made to be the same.

An upper substrate 210 faces the lower substrate 110, and a conductive member is formed on the upper substrate 210.

The conductive member as a material that may generate capacitance along with the signal lines 121 includes a metal and an organic material. For example, the conductive member may be a light blocking member 220 made of the organic material or the metal, or may be the common electrode 270 made of indium tin oxide ("ITO") or indium zinc oxide ("IZO"). Also, a conductive member including the light blocking member 220 and the common electrode 270 may be indicated. According to a result of an experiment, a light blocking member 220 that is made of the organic material has resistance of at most about $10^{10}$ Ω·cm and dielectric constant of equal to or over about 25. such that it may generate capacitance along with the signal lines 121.

In the present exemplary embodiment, the case in which the conductive member is made of only the light blocking member 220 is described.

The light blocking member 220 is formed on the upper substrate 210 adjacent the edge of the display area PA and blocks light leakage on the edge. The light blocking member 220 is further formed inside the display area PA, and the light blocking member 220 includes a plurality of openings facing the pixel electrodes 191 and having almost the same shape as the pixel electrodes 191 to block light leakage between the pixel electrodes 191. An insulating layer (not shown) and the common electrode 270 are sequentially formed on the light blocking member 220 disposed inside the display area PA. The insulating layer and the common electrode 270 may also be formed on the light blocking member 220 disposed adjacent the edge of the display area PA.

The light blocking member 220 disposed adjacent the edge of the display area PA overlaps the gate driver 400, but does not overlap the signal lines 121.

Among the signal lines 121, a distance r between the signal line 121 disposed at the innermost side of the lower substrate 110 and the pattern of the light blocking member 220 projected to the lower substrate 110 is at least about 10 µm. If the distance r is less than 10 µm, when a misalignment occurs while combining the upper substrate 210 and the lower substrate 110, capacitance is generated between the light blocking member 220 and the signal line 121 disposed at the innermost side such that longitudinal stripes may appear. That is, since misalign margin of the upper substrate 210 and the lower substrate 110 is at most 10 µm, if the distance r is less than 10 µm then the light blocking member 220 may overlap the signal line 121 disposed at the innermost side due to a misalignment to generate capacitance between them. The maximum value of the distance r is restricted by the distance between the signal line 121 at the innermost side and the gate driver 400.

An interval $s_1$ between two neighboring signal lines 121 may at least about 10 µm. If the interval $s_1$ between two neighboring signal lines 121 is less than 10 µm, the signal lines 121 may be shorted or parasitic capacitance generated between two neighboring signal lines 121 may be over a permitted value.

The width $w_1$ of the signal lines 121 is in a range of about 60 µm to about 290 µm. If the width $w_1$ of the signal lines 121 is less than 60 µm, the resistance thereof may be increased, and if the width $w_1$ of the signal lines 121 is more than 290 µm, the capacitance may be increased. However, the width $w_1$ of the signal lines 121 may be changed according to the design.

According to this structure as shown in FIGS. 4 and 5, the signal lines 121 are not overlapped by the light blocking member 220 such that the signal lines 121 may substantially have the same resistance and the same capacitance. Also, the diverged lines 125 respectively overlap the light blocking member 220 with a different width such that the overlapping areas between the diverged lines 125 and the light blocking member 220 may all be the same. Accordingly, the diverged lines 125 may all have substantially the same resistance and the same capacitance.

Figure 11:
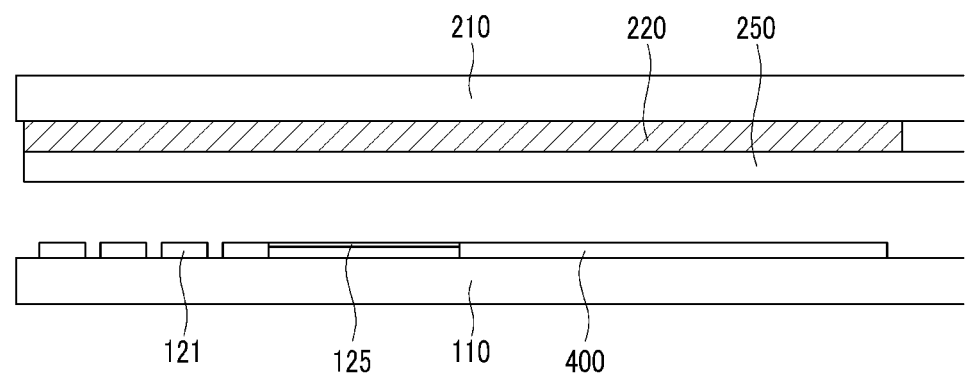

On the other hand, as shown in FIG. 11, the light blocking member 220 formed adjacent the edge of the display area PA may overlap the gate driver 400 and a plurality of signal lines 121. An overcoat 250 providing a flat surface may be formed on the light blocking member 220.

Next, a display device according to another exemplary embodiment of the present invention will be described in detail with reference to FIG. 6 and FIG. 7.

Figure 6:
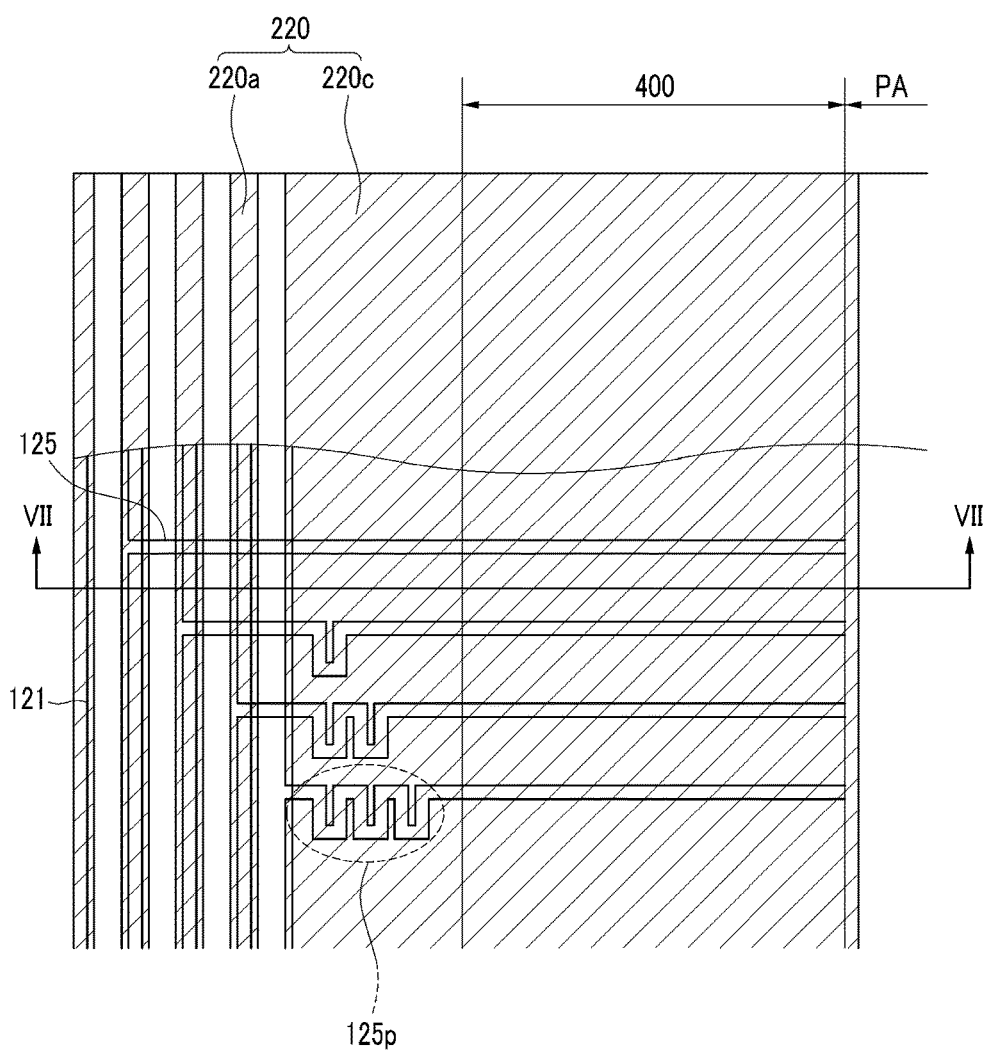
FIG. 6 is a layout view of an exemplary display device according to another exemplary embodiment of the present invention.
Figure 7:
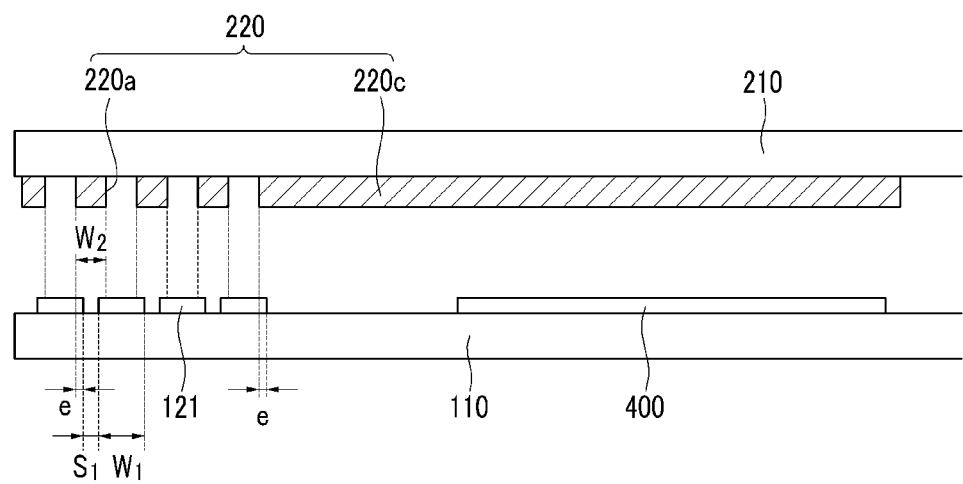
FIG. 7 is a cross-sectional view of the exemplary display device shown in FIG. 6 taken along line VII-VII.

FIG. 6 is a layout view of an exemplary display device according to another exemplary embodiment of the present invention, and FIG. 7 is a cross-sectional view of the exemplary display device shown in FIG. 6 taken along line VII-VII.

Referring to FIG. 6 and FIG. 7, a display device according to the present exemplary embodiment includes a lower substrate 110, a gate driver 400 formed on the lower substrate 110, a plurality of signal lines 121 formed on the side of the gate driver 400, a plurality of diverged lines 125 connected to the signal lines 121 and including a bent portion 125p with a zigzag shape, an upper substrate 210 facing the lower substrate 110, and a light blocking member 220 formed on the upper substrate 210.

The structures of the lower substrate 110, the gate driver 400, the signal lines 121, the diverged lines 125, the upper substrate 210, and the light blocking member 220 disposed inside the display area PA according to the present exemplary embodiment are substantially the same as the exemplary embodiment shown in FIG. 4 and FIG. 5.

However, the light blocking member 220 disposed adjacent the edge of the display area PA includes a plurality of light blocking members 220 that are separated, different from the light blocking member 220 of FIG. 4 and FIG. 5.

The light blocking members 220 include light blocking members 220a respectively facing the regions between two neighboring signal lines 121 and a light blocking member 220c overlapping portions of the gate driver 400 and the diverged lines 125.

The minimum of the width $w_2$ of the light blocking members 220a facing the regions between two neighboring signal lines 121 may be about 10 μm and the maximum thereof may be about {the maximum interval $s_1$ between the signal lines 121+(the width $w_1$ of the signal lines 121−10 μm)}μm, and portions of the light blocking members 220a overlap edge portions of the signal lines 121. Also, the light blocking member 220c overlapping the gate driver 400 overlaps the edge portion of the signal line 121 disposed on the innermost part of the lower substrate 110. The minimum of the width e of the portion that the light blocking members 220a and 220c overlap the signal line 121 may be about 9 μm, and the maximum thereof may be about {(the width $w_1$ of the signal line 121−10 μm)/2}μm. If the width e is less than 9 μm, when an error is generated while aligning the upper and lower substrates 210 and 110, the light blocking members 220a and 220c do not cover between the signal lines 121 such that the light leakage may be generated, and if the width e is more than {(the width $w_1$ of the signal line 121−10 μm)/2}μm, the capacitance generated between the light blocking members 220a and 220c and the signal lines 121 may be increased such that a delay of the control signal may exceed a permitted range.

Figure 8:
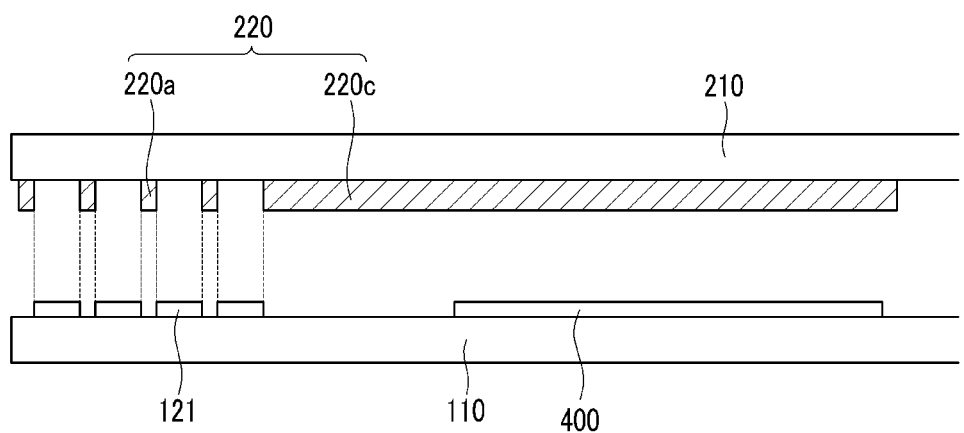
FIG. 8 to FIG. 11 are cross-sectional views of exemplary display devices according to other exemplary embodiments of the present invention.

However, if the upper and lower substrates 210 and 110 are combined without an overlap, as shown in FIG. 8, the light blocking members 220a corresponding to the regions between two signal lines 121 do not overlap the signal lines 121. Here, the light blocking member 220c overlapping the gate driver 400 does not overlap the edge portion of the signal line 121 disposed in the innermost part of the lower substrate 110. However, the light blocking member 220c overlapping the gate driver 400 may alternatively overlap the edge portion of the signal line 121 disposed at the innermost part of the lower substrate 110.

Next, a display device according to other exemplary embodiments of the present invention will be described in detail with reference to FIG. 9 and FIG. 10.

Figure 9:
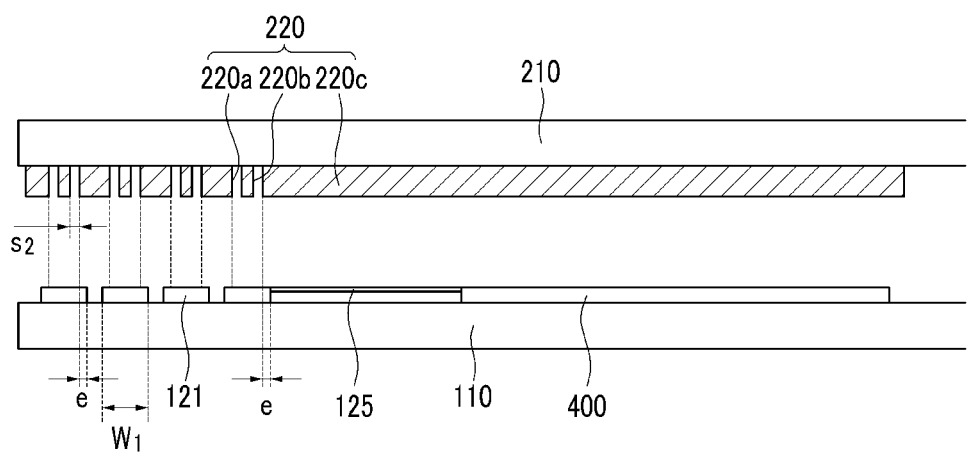
Figure 10:
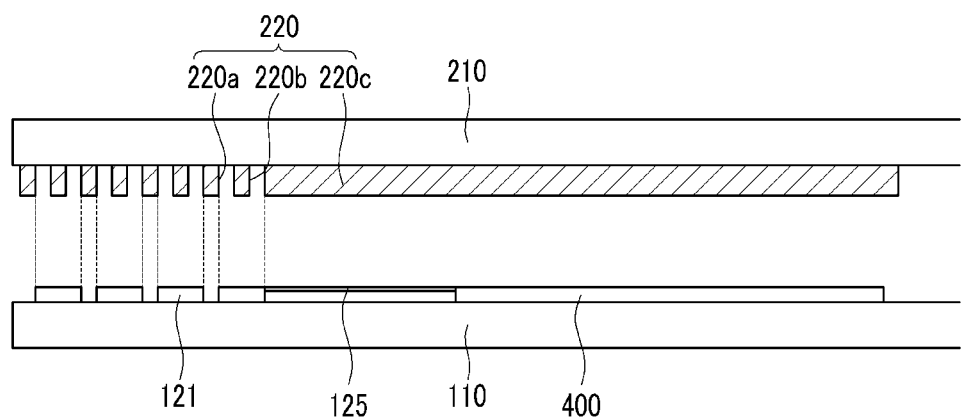

FIG. 9 is a cross-sectional view of an exemplary display device according to another exemplary embodiment of the present invention, and FIG. 10 is a cross-sectional view of an exemplary display device according to another exemplary embodiment of the present invention.

Referring to FIG. 9 and FIG. 10, a display device according to the present exemplary embodiment includes a lower substrate 110, a gate driver 400 formed on the lower substrate 110, a plurality of signal lines 121 formed on the side of the gate driver 400, a plurality of diverged lines 125 connected to the signal lines 121, an upper substrate 210 facing the lower substrate 110, and light a blocking member 220 formed on the upper substrate 210.

The structures of the lower substrate 110, the gate driver 400, the signal lines 121, the diverged lines 125, the upper substrate 210, and the light blocking member 220 disposed inside the display area PA according to the present exemplary embodiment are substantially the same as the exemplary embodiment shown in FIG. 4 and FIG. 5.

However, the light blocking member 220 disposed adjacent the edge of the display area PA includes a plurality of light blocking members 220 that are separated, different from the light blocking member 220 of FIG. 4 and FIG. 5.

The light blocking member 220 includes first light blocking members 220a facing the regions between two neighboring signal lines 121, second light blocking members 220b overlapping the central portion of the signal lines 121, and a third light blocking member 220c overlapping portions of the gate driver 400 and the diverged lines 125.

The first light blocking members 220a overlap the edge portions of the signal lines 121. Also, the third light blocking member 220c overlaps the edge portion of the signal line 121 disposed at the innermost part of the lower substrate 110. The minimum of the width e of the overlapping portion between the first and third light blocking member 220a and 220c, and the corresponding signal line 121, may be about 9 μm, and the maximum thereof may be about {(the width $w_1$ of the signal line 121−10 μm)/2}μm. If the width e is less than 9 μm, if an error is generated while aligning the upper and lower substrates 210 and 110, the light blocking members 220a and 220c are not covered between the signal lines 121 such that light leakage may be generated, and if the width e is more than {(the width $w_1$ of the signal line 121−10 μm)/2}μm, the capacitance generated between the light blocking members 220a and 220c and the signal lines 121 may be increased such that a delay of the control signal may over a permitted range.

The second light blocking members 220b are disposed between two first light blocking members 220a, and between the first light blocking member 220a and the third light blocking member 220c, and have an interval between the first and third light blocking members 220a and 220c. The second light blocking members 220b overlap a central region of the signal lines 121, and minimize light leakage reflected from the signal lines 121. The second light blocking members 220b may have a width smaller than a width of the signal lines 121.

The minimum of the interval $s_2$ between the second light blocking member 220b and the first light blocking member 220a may be about 10 μm. If the interval $s_2$ between the second light blocking member 220b and the first light blocking member 220a is less than 10 μm, the capacitance between the light blocking member 220 and the signal lines 121 is significantly increased such that the delay of the control signal may exceed the permitted range.

On the other hand, if the upper and lower substrates 210 and 110 are combined without the overlap, as shown in FIG. 10, the light blocking member 220a may not overlap the signal lines 121. The light blocking member 220b may still overlap a central region of the signal lines 121, as in FIG. 9. Here, the light blocking member 220c does not overlap the edge portion of the signal line 121 disposed at the innermost part of the lower substrate 110. However, in an alternative exemplary embodiment, the third light blocking member 220c may overlap the edge portion of the signal line 121 disposed at the innermost part of the lower substrate 110.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a first substrate;
   a driving portion disposed on the first substrate;
   a plurality of signal lines disposed on the first substrate to transmit signals that are changed per period to the driving portion;
   a second substrate facing the first substrate; and
   a conductive member formed on the second substrate,
   wherein the conductive member overlaps the signal lines,
   wherein the conductive member has resistivity at most about $10^{10}$ Ω·cm and dielectric constant at least about 25.

2. The display device of claim 1, further comprising an overcoat formed on the conductive member,
   wherein the overcoat overlaps all the signal lines.

* * * * *